United States Patent
Roberts et al.

(10) Patent No.: US 7,590,053 B2
(45) Date of Patent: Sep. 15, 2009

(54) MULTIPLE ENDPOINT PROTECTION USING SPVCS

(75) Inventors: Peter Roberts, Stittsville (CA); Carl Rajsic, Nepean (CA)

(73) Assignee: Alcatel Lucent, Paris (FR)

( * ) Notice: Subject to any disclaimer, the term of this patent is extended or adjusted under 35 U.S.C. 154(b) by 646 days.

(21) Appl. No.: 11/156,566

(22) Filed: Jun. 21, 2005

(65) Prior Publication Data

US 2006/0285486 A1 Dec. 21, 2006

(51) Int. Cl.
*G06F 11/00* (2006.01)
(52) U.S. Cl. .................... 370/225; 370/395.1
(58) Field of Classification Search ........... 370/216, 370/225, 395.1
See application file for complete search history.

(56) References Cited

U.S. PATENT DOCUMENTS

| | | | |
|---|---|---|---|
| 4,650,990 A * | 3/1987 | Jonsson | 250/221 |
| 5,818,828 A * | 10/1998 | Packer et al. | 370/346 |
| 6,011,780 A | 1/2000 | Vaman et al. | |
| 6,195,351 B1 | 2/2001 | Hiscock et al. | |
| 6,567,425 B1 * | 5/2003 | Szabo et al. | 370/522 |
| 7,233,571 B1 * | 6/2007 | Krishnamurthy et al. | 370/236 |
| 7,346,119 B2 * | 3/2008 | Gorecki et al. | 375/268 |
| 2003/0202510 A1 * | 10/2003 | Witkowski et al. | 370/386 |
| 2005/0002339 A1 * | 1/2005 | Patil et al. | 370/237 |

FOREIGN PATENT DOCUMENTS

EP 1489861 12/2004

* cited by examiner

*Primary Examiner*—Derrick W Ferris
*Assistant Examiner*—Omar Ghowrwal (57) ABSTRACT

A system and method are provided for a multi-endpoint SPVC, the multi-endpoint SPVC providing redundancy. A primary SPVC is established through a first source node. An intermate communication channel (ICC) is established between the first source node and a second source node. If the primary SPVC fails, the second source node learns of this via the ICC and establishes an alternate SPVC. If the first source node fails, the second source node learns of this failure without having to be explicitly told. The second source node learns of the failure of the first source node when poll messages are no longer received over the ICC as indicated by expiry of a timer. In such an event, the second source node attempts to establish an alternate SPVC. Finite state machines are provided on each source node to monitor the status of each other. Command messages, in the form of Generic Application Transport information elements, are provided by which the finite state machines can communicate over the ICC.

10 Claims, 3 Drawing Sheets

| STATE / EVENT | DOWN | ATTEMPTING | UP | MATE ATTEMPTING | MATE UP |
|---|---|---|---|---|---|
| MATE NETWORK CONNECTION DOWN | ACTION 1 ATTEMPTING | ACTION 0 ATTEMPTING | ACTION 0 UP | ACTION 2 ATTEMPTING | ACTION 2 ATTEMPTING |
| MATE NETWORK CONNECTION UP | ACTION 0 MATE UP | ACTION 3 MATE UP | ACTION 4 MATE UP | ACTION 0 MATE UP | ACTION 0 MATE UP |
| MATE ATTEMPTING NETWORK CONNECTION | ACTION 0 MATE ATTEMPTING | ACTION 3 MATE ATTEMPTING | FSM_ERR | FSM_ERR | ACTION 0 MATE ATTEMPTING |
| NETWORK CONNECTION REATTEMPT | FSM_ERR | ACTION 5 ATTEMPTING | ACTION 2 ATTEMPTING | FSM_ERR | FSM_ERR |
| NETWORK CONNECTION CONNECT RECEIVED | FSM_ERR | ACTION 6 UP | FSM_ERR | FSM_ERR | FSM_ERR |
| LOCAL UNI PORT DOWN | FSM_ERR | ACTION 7 DOWN | ACTION 8 DOWN | ACTION 0 MATE ATTEMPTING | ACTION 0 MATE UP |

FIG. 3

MULTIPLE ENDPOINT PROTECTION USING SPVCS

FIELD OF THE INVENTION

The invention relates to redundancy of ATM connections, and more particularly to redundancy of SPVC connections.

BACKGROUND OF THE INVENTION

Redundancy in ATM systems is currently provided using multiple Permanent Virtual Channels (PVCs), and uses a Network Management System (NMS) to detect failure on a primary path and to switch to the redundant path. The NMS detects failure both within the network at network-network interfaces (NNIs) and at customer attachment points at User-Network Interfaces (UNIs). Not only does this approach use the inefficiencies of multiple PVCs with their fixed routing, but a heavy load is also placed on the NMS.

Moving control of multiple endpoint (MEP) redundant connections from the NMS to within the network would allow drastically faster fault detection and recovery, as well as greater scalability.

SUMMARY OF THE INVENTION

In accordance with one aspect of the invention, a method is provided for providing redundancy for communications through a communication network. An Intermate Communication Channel (ICC) is established between a primary source node and an alternate source node. A primary SPVC network connection is established through the primary source node to one of at least one destination node. If it is determined that the alternate source node is to attempt establishment of an alternate network connection, an alternate SPVC network connection is established through the alternate source node to one of the possible network connections.

The alternate source node may be responsible for establishing an alternate network connection if the primary source node cannot support an SPVC network connection, or if the ICC fails. The ICC may be a connection-oriented bearer independent connection.

In accordance with another aspect of the invention, a node within a communication network is provided. The node includes a finite state machine (FSM) for storing a state of the node. The node includes a memory for storing a data structure, the data structure including an indication of whether the node is a primary source node or an alternate source node, and an indication of whether the FSM is a master FSM or a slave FSM. The node includes means for establishing an Intermate Communication Channel (ICC) to a mate node in the event that the FSM is a master FSM. The node includes means for establishing an SPVC network connection in the event that the node is a primary source node. The node includes means for determining whether the ICC is up. The node includes means for establishing an SPVC network connection in the event that the node is an alternate source node and that the FSM indicates a state of Mate Network Connection Down. The node includes means for establishing an SPVC network connection in the event that the node is an alternate source node and that the ICC is not up.

The means for determining whether the ICC is up may include use of an Intermate Connection Inactivity Timer, stored in the data structure. The Intermate Connection Inactivity Timer is restarted upon receipt of a command message over the ICC. If the Intermate Connection Inactivity Timer expires, it is determined that the ICC is not up.

Source nodes are provided for storing data structures and finite state machines for carrying out the methods of the invention. The methods may be stored in the form of software instructions stored on computer-readable media.

The methods and apparatus of the present invention allow redundant multiple endpoint connections to be maintained without wasting network and network management system resources. The use of SPVCs saves bandwidth, compared with using both primary and backup PVCs continually connected. The use of SPVCs allows connections to be automatically re-routed upon failure of intermediate nodes. The use of SPVCs also allows monitoring of the primary connection and establishment of the backup connection upon failure at the source nodes using a finite state machine, rather than at a network management system.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

Figure 1:
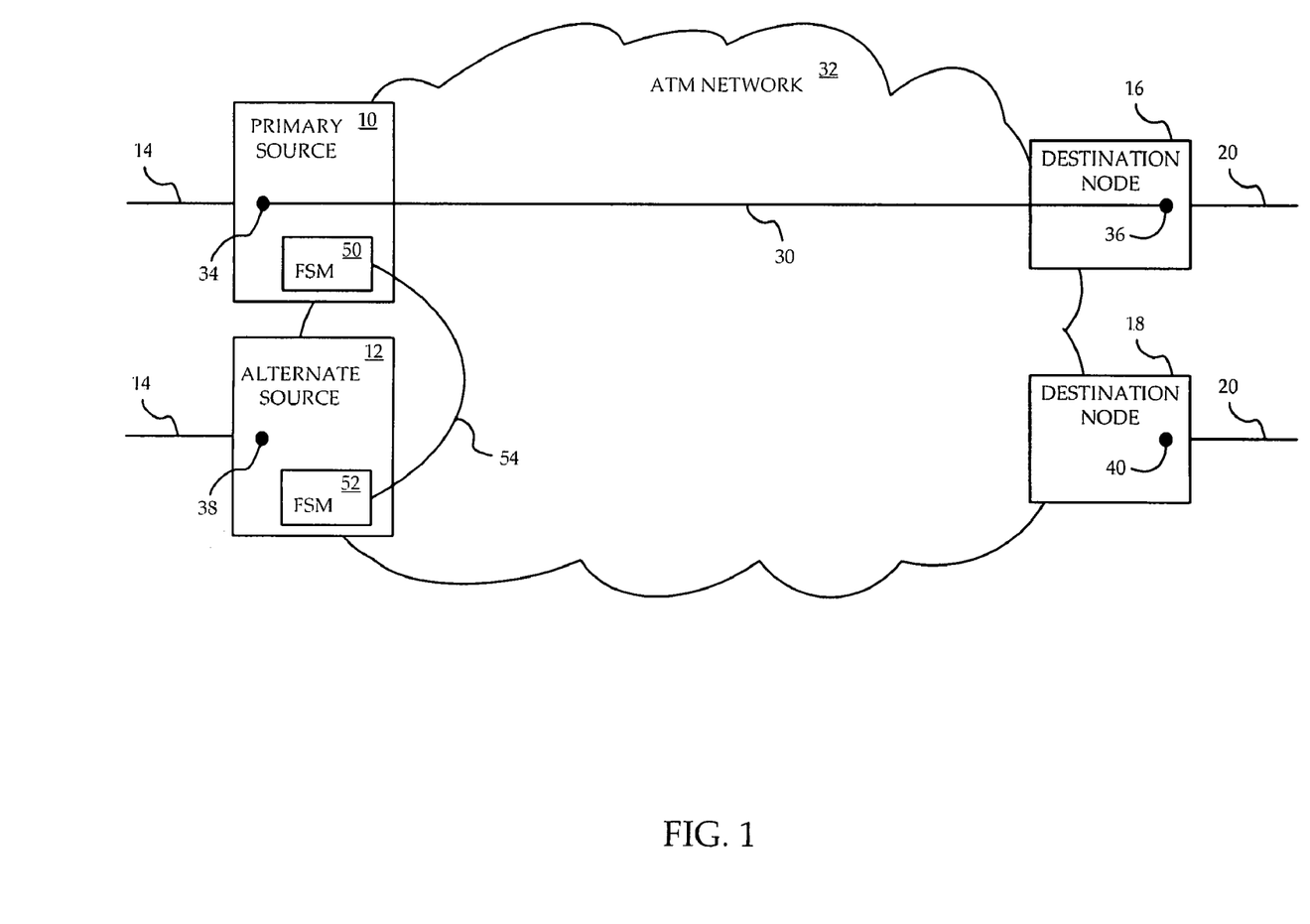
FIG. 1 is a block diagram of a portion of an example network in which multiple endpoint protection is implemented using soft permanent virtual connections networks, according to one embodiment of the invention.

Referring to FIG. 1, a block diagram of a portion of an example network in which multiple endpoint protection is implemented using soft permanent virtual connections networks according to one embodiment of the invention is shown. A calling customer (not shown) accesses each of a primary source node 10 and an alternate source node 12 through respective User-Network Interfaces (UNIs) 14. A called customer (not shown) is accessed through either of a first destination node 16 or a second destination node 18 through respective UNIs 20. There may be a single destination node but greater redundancy is provided with more than one destination node, as will be clear from the description below. There may be more than two destination nodes, the precise number being determined by the value of the Possible Destinations in the data structure described below.

A primary soft permanent virtual circuit (SPVC) 30 is established between the primary source node 10 and the first destination node 16 through an Asynchronous Transfer Mode (ATM) network 32. The primary SPVC 30 originates at a first source endpoint 34 within the primary source node 10 and terminates at a first destination endpoint 36. The alternate source node 12 includes a second source endpoint 38 and the second destination node 18 includes a second destination endpoint 40. Each of the first source endpoint 34, second source endpoint 38, first destination endpoint 36, and second destination endpoint 40 are designated as belonging to a multi-endpoint (MEP) SPVC between the calling customer and the called customer. Each of the source nodes refers to the other source node as its mate.

If the SPVC 30 is down, then an alternate SPVC (not shown in FIG. 1) may be established, between the second source endpoint 38 and one of the destination end points 36 and 40. The availability of the alternate SPVC provides MEP redundancy without continuously reserving circuit resources for both circuits. A network connection is a connection between either of the source nodes and either of the destination nodes, and which provides communication between the calling party and the called party. This redundancy is explained in more detail below with reference to FIG. 3.

The primary source node 10 includes a master finite state machine (FSM) 50 and the alternate source node 12 includes a slave FSM 52. The primary source node 10 and the alternate source node 12 each include an instance of a source MEP data structure (not shown) which stores information. Amongst other information described in more detail below, each instance of the source MEP data structure includes a flag indicating whether the node in which the data structure resides is the primary source node or the alternate source node, the flag being referred to as the Primary EP Designation. The logic within each FSM (described in more detail below) is identical, but behavior depends in part on the value of the Primary EP Designation, that is, on whether the node in which the FSM exists is the primary source node or the alternate source node.

An intermate communications channel (ICC) 54 originates at the master FSM 50 and terminates at the slave FSM 52. The ICC 54 is a connection-oriented bearer independent connection used to communicate between the two FSMs. The ICC 54 has no bearer plane associated with it, and provides an established channel on which control plane messages may be exchanged.

Broadly, in operation the master FSM establishes an intermate communications channel to the slave FSM. The primary source node establishes an SPVC to the first destination node. If the primary source node becomes unable to support the SPVC to the first destination node, the FSM on the alternate source node becomes aware of this over the intermate communication channel and the alternate source node establishes an alternate SPVC to the first destination node. The FSM on the alternate source node also establishes an alternate SPVC to the first destination node if the ICC fails.

Source MEP Data Structure

The source MEP data structure will now be explained in more detail. On each source node, the source MEP data structure includes the following fields:

State: The state of the FSM on the source node in which the data structure resides Last Received Mate Indication: The state of the source node's mate, as indicated by the value of the MEP Action in the last MEP command message received from the source node's mate.

Mate MEP Identifier: The ATM address and endpoint identifier of the mate node, to be used to establish the ICC for this MEP instance.

Primary EP Designation: A flag indicating whether the source node in which the data structure resides is the primary source node. If this source node is not the primary source node, it is the alternate source node. The decision as to which source node is the primary source node is preferably determined as the source node having the highest ATM address, but may be made in any unambiguous manner. The primary source node is the node through which a customer prefers to connect to a destination.

Intermate Communication Channel: The endpoint identifier of the ICC on this node. This is a reference used by the node in order to get messages to the mate node. This field is optional.

Master/Slave: A flag indicating whether the FSM on this source node is the master FSM or the slave FSM. The master FSM is responsible for initiating the ICC. The decision as to which FSM is the master FSM is preferably determined as the FSM on the source node having the highest ATM address, but may be made in any unambiguous manner. The master FSM may be located on the primary source node, but this is not required.

Current Destination: The destination endpoint (given as an ATM address and an endpoint identifier) to which the SPVC is established or being attempted.

Possible Destinations: A list of the possible destination endpoints to which the SPVC may be established.

Maximum Reattempts: The maximum number of SPVC connection reattempts that can be made by this node before sending a "Mate Network Connection Down" command message to the mate (default=1).

Reattempt Countdown: The number of reattempts remaining before sending a "Mate Network Connection Down" command message to the mate.

Intermate Response Interval: The maximum time for which the node should await an MEP_Response from the mate, matching an MEP_Command sent to the mate (default=5 seconds).

Intermate Response Timer: The timer started when the node sends an MEP_Command to the mate, and is stopped when the node receives a corresponding MEP_Response. If the timer expires, the node retransmits the original MEP_Command.

Intermate Connection Inactivity Interval: The maximum duration the ICC can be down or the maximum duration without receiving a message from the mate. This interval should larger than the Intermate Connection Poll Interval (default 60 seconds).

Intermate Connection Inactivity Timer: The timer started when the ICC is first established or whenever a command message is received from the mate. Expiry of this timer indicates a problem with communications between the two source nodes (or more particularly, the two FSMs), and the establishment of the ICC by the master FSM will need to be re-attempted. On either node, the FSM releases the existing ICC. Following release by the master FSM, the master FSM attempts to re-establish the ICC.

Intermate Connection Poll Interval: The length of time the FSM waits to send an MEP_Poll message to the mate (default=15 seconds).

Intermate Connection Poll Timer: This timer is started when the ICC is established, and is restarted upon expiry of the Intermate Connection Poll Interval. It is stopped if the ICC is down.

Intermate Connection Retry Interval: The length of time between attempts by the master FSM to re-establish the ICC, if the ICC is down (default=5 seconds).

Intermate Connection Retry Timer: This timer is started when the master FSM attempts to establish the ICC. Upon expiry, the master FSM re-attempts to establish the ICC.

Command Sequence Number: An unsigned 31 bit number identifying MEP command messages. The number is set to a value of 0 upon instantiation and is then incremented by 1 for each message sent to the mate.

ICC Establishment and Communications

Management of the ICC 54 will now be discussed in more detail. It is the responsibility of the master FSM 50 to establish the ICC 54 to the slave FSM 52. Upon initial configuration of the data structure with the Master/Slave field set to Master and the subsequent enabling of the FSM, the master FSM 50 initiates establishment of the ICC 54 to the slave FSM 52 by sending an SPVC Setup message to the alternate source node 12. The master FSM 50 uses the ATM address from the Mate MEP Identifier and encodes the endpoint identifier from the Mate MEP Identifier into a Called Party Soft PVPC or PVCC information element. If the call establishment is unsuccessful, the master FSM 50 starts the Intermate Connection Retry Timer, and upon expiry of the Intermate Connection Retry Timer tries to establish the ICC again.

Upon receipt of the Setup message at the alternate source node 12, the alternate source node 12 extracts the Called Party information element. If the extracted Called Party information element indicates an endpoint identifier that does not correspond to the slave FSM 52, the call is released. If the extracted Called Party information element indicates an endpoint identifier corresponding to the slave FSM 52, the new connection is accepted as the ICC 54. If the slave FSM 52 already has a connection identified by the Intermate Connection, the existing connection is released and the new connection is accepted as the ICC 54.

Once the ICC 54 has been established, each FSM resets the value of the Command Sequence Number in the data structure to 0. Thereafter, the FSMs communicate over the ICC 54 using MEP command messages, described below.

Once the ICC 54 has been established, each FSM begins its respective Intermate Connection Poll Timer. Expiry of this timer triggers the FSM to send a MEP_Poll message to its mate. The timer is stopped and then restarted upon transmission of any MEP command message. Once the ICC 54 is established, each FSM also starts its respective Intermate Connection Inactivity Timer. This timer is restarted upon receipt of any MEP command message from the mate of the FSM. Expiry of this timer indicates a failure in the ICC 54. The FSM which detects the failure of the ICC 54 releases the ICC 54. The master FSM then attempts to re-establish the ICC 54.

MEP Command Messages

Figure 2:
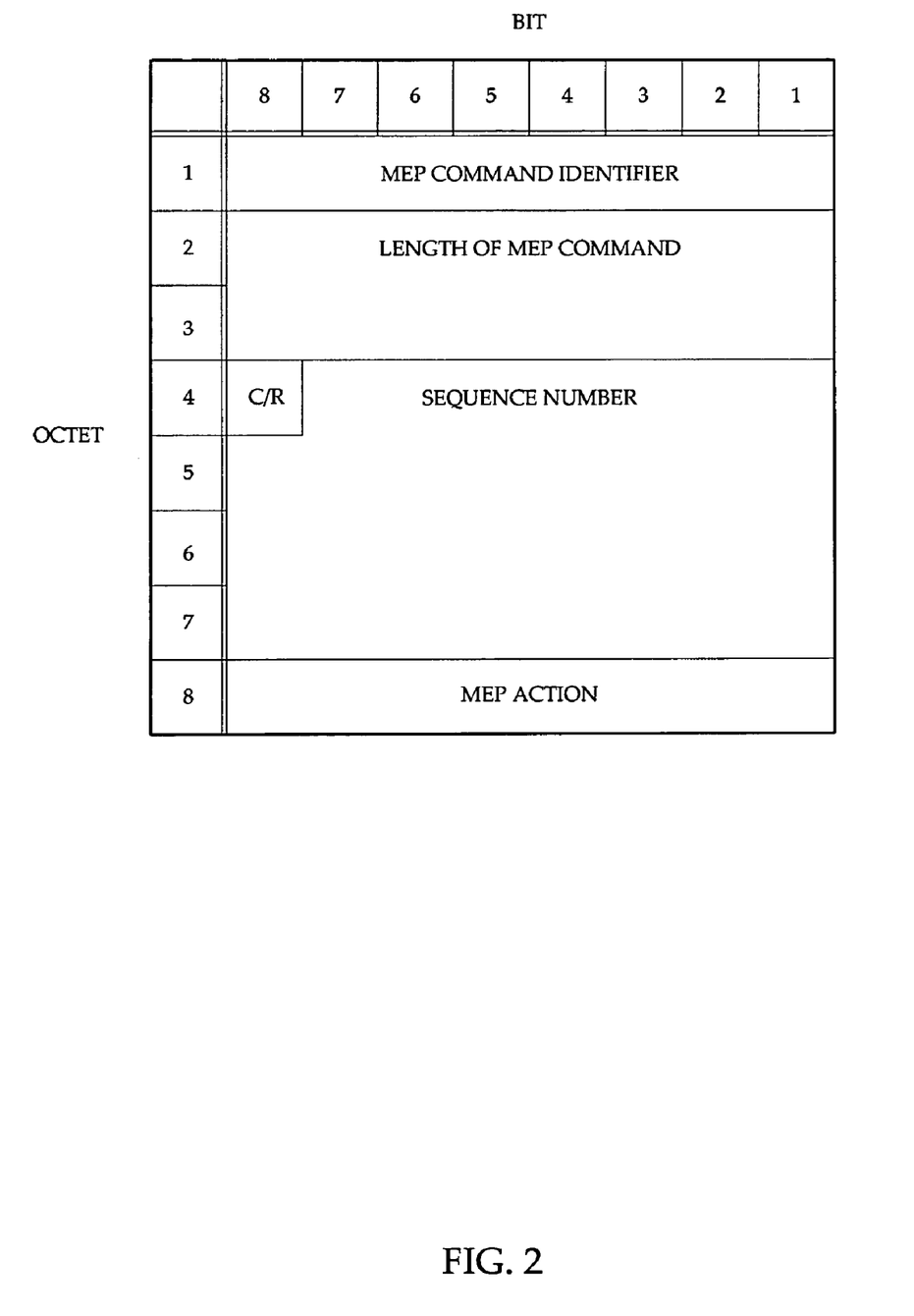
FIG. 2 is a diagram of the structure of an MEP command message sent by each FSM of FIG. 1, according to one embodiment of the invention.

Referring to FIG. 2, the structure of a MEP command message is shown according to one embodiment of the invention. The MEP command messages are sent as NOTIFY messages over the ICC 54, and are embedded in the Generic Application Transport (GAT) information element of the NOTIFY messages. Each MEP command message contains 64 bits, and the following fields: MEP Command Identifier, Length of the MEP Command, C/R, Sequence Number, and MEP Action.

The MEP Command Identifier field begins at octet 1 bit 8 and is 8 bits in length. The value identifies the start of the sequence of bytes as an MEP command message, in conformance with the Type/Length/Value structure of information element octet groups.

The Length of the MEP Command field begins at octet 2 bit 8 and is 16 bits in length. This is the length field of the standard Type/Length/Value structure of information element octet groups.

The C/R field is a one bit value at octet 4 bit 8. A value of 0 indicates that this MEP command message is a command, in contrast with a value of 1 indicating that the MEP command message is a response. The FSM which initially sends an MEP command message is referred to herein as the originating FSM, and will populate the C/R field of the MEP command message being sent with a value of 0. The FSM which receives an MEP command message having a C/R value of 0 is referred to herein as the acknowledging FSM, and acknowledges the MEP command message by sending an exact copy of the message back to the originating FSM after replacing the C/R value with a value of 1.

The Sequence Number field begins at octet 4 bit 7 and ends at octet 7 bit 1, and is 31 bits in length. The value identifies the message exchange (including command and response) between the two FSMs.

The MEP Action field begins at octet 8 bit 8 and ends at octet 8 bit 1, and is 8 bits in length. The value indicates an action or an event that has occurred, and is the information on which the mate FSM decides a course of action as described below with respect to the logic of the FSM (other than MEP_Poll messages). A value of 0 indicates that this MEP command message is an MEP_Poll message. A value of 1 indicates that this MEP command message indicates that the originating FSM has entered a state of Network Connection Down. A value of 2 indicates that this MEP command message indicates that the originating FSM has entered a state of Network Connection Up. A value of 3 indicates that this MEP command message indicates that the originating FSM has entered a state of Attempting Connection. The remaining values are undefined.

When an originating FSM sends an MEP command message to its mate, the originating FSM increments its value of the Command Sequence Number in its database, populates the Sequence. Number field of the MEP command message with the new value of the Command Sequence Number, and sets the C/R field of the MEP command message to a value of 0. The originating FSM also starts or restarts the Intermate Response Timer.

When an FSM receives an MEP command message with a C/R field having a value of 0, it acknowledges the MEP command message as described above, and may carry out an action as described below with reference to FIG. 3 describing the methods of the FSM. The FSM also updates the value of the Last Received Mate Indication in the data structure, unless the MEP command message is a Poll message (the value of the MEP Action is 0).

When an FSM receives an MEP command message with a C/R field having a value of 1, the FSM compares the value of the Sequence Number field of the MEP command message with the Command Sequence Number of the database of the FSM. If the values match, then the message is simply an acknowledgment of the last MEP command message sent by the FSM, and the Intermate Response Timer is stopped. If the value of the Sequence Number is less than the Command Sequence Number, then the MEP command message is simply an acknowledgment of an old MEP command message sent by the FSM, and no action is taken. If the value of the Sequence Number is greater than the Command Sequence Number, then an error has occurred, the message is discarded, and management is informed.

If the Intermate Response Timer expires, then the FSM resends the last MEP command message sent to the mate FSM. This is done in case the last MEP command message was dropped due to network congestion.

FSM Methods

Figure 3:
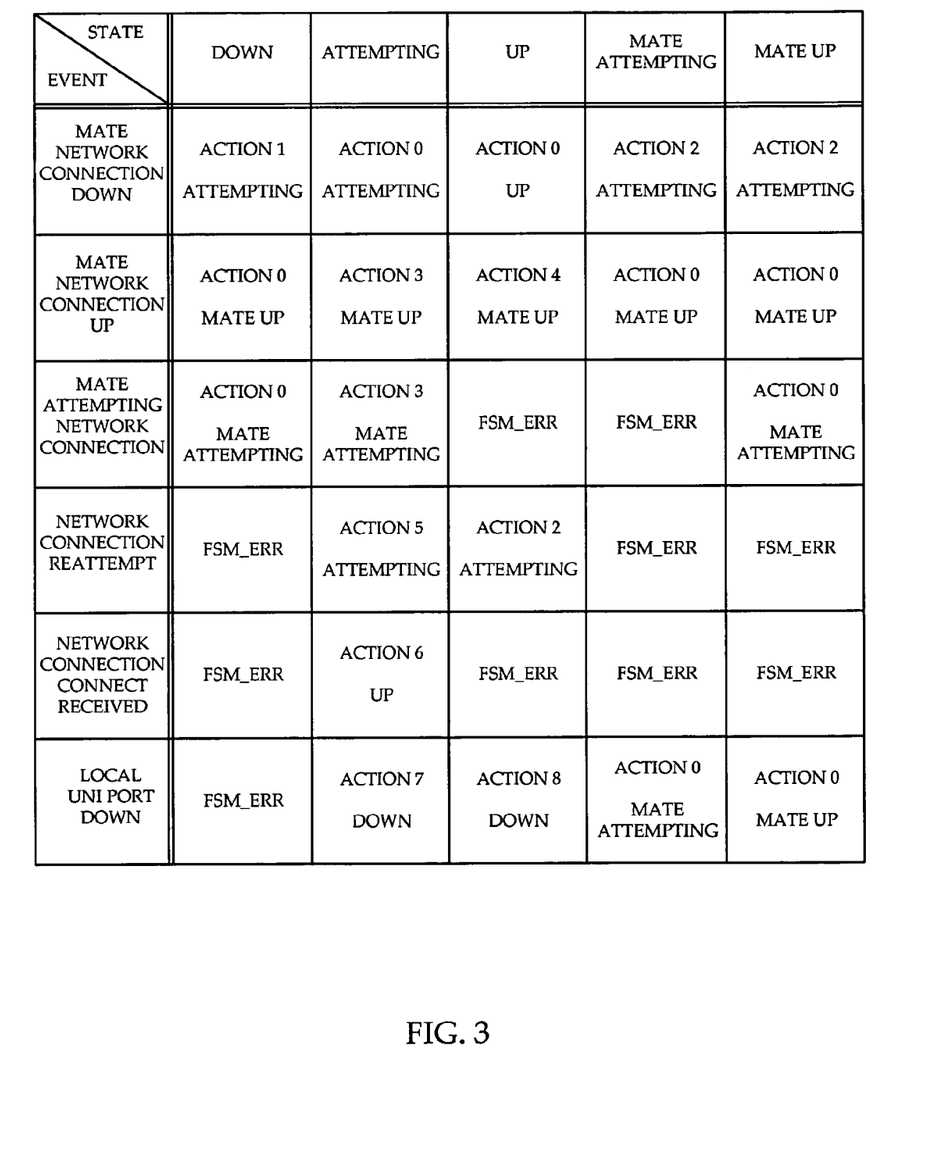
FIG. 3 is a table of a finite state machine implemented at each of the source nodes of FIG. 1, according to one embodiment of the invention.

Referring to FIG. 3, the methods carried out by each of the nodes is shown according to one embodiment of the invention. The methods are embedded in and carried out by each of the FSMs 50 and 52. Each FSM is in one of five states listed across the top of the table shown in FIG. 3 and defined as follows:

Down: This is the initial state of an FSM. This state indicates that the network connection from the source node on which the FSM resides to one of the destination nodes is down, or that the local UNI port 14 of the source node on which the FSM resides is down. In either event, communication between the calling party and the called party through this source node is not currently available.

Attempting: This state indicates that the node on which the FSM resides is attempting to establish a network connection.

Up: This state indicates that the network connection is established through the source node on which the FSM resides.

Mate Attempting: This state indicates that the FSM on the other node is attempting to establish the network connection through the mate source node.

Mate Up: This state indicates that the network connection is established through the mate source node.

Each FSM monitors for the six events listed on the left hand side of the table shown in FIG. 3. These are events which may cause a change in the state of the FSM. The events are triggered upon development of physical occurrences, such as receipt of an MEP command message from the mate FSM, as defined as follows:

Mate Network Connection Down: This event is used to indicate to the FSM that the FSM is to attempt a network connection. The event is triggered in one of four ways: (1) the Internate Connection Inactivity Timer expires and the local UNI port is up, (2) the FSM receives an MEP command message indicating that the mate source node does not have a network connection (C/R bit is 0 and MEP Action has a value of 1) and the local UNI port is up, (3) the local UNI port has come up from being down and the value of the Last Received Mate Indication in the data structure is "Mate Network Connection Down" or "Unknown", or (4) the local UNI port has come up from being down, this node is the primary source node, and the value of the Last Received Mate Indication in the data structure is "Mate Attempting Connection".

Mate Network Connection Up: This event is used to indicate that a network connection has been established through the mate source node. The event is triggered upon receipt of an MEP command message indicating that the mate source node has established a network connection (C/R bit is 0 and MEP Action has a value of 2). However, if the FSM receives such an MEP command message and the state of the FSM is Up, the FSM must be running on the alternate source node in order for this event to be triggered.

Mate Attempting Network Connection: This event is used to indicate that the mate FSM is attempting to establish a network connection. The event is triggered in one of five ways: (1) the FSM receives an MEP command message indicating that the mate source node is attempting to establish a network connection (C/R bit is 0 and MEP Action has a value of 3) and the state of the FSM is Mate Up, (2) the FSM receives an MEP command message indicating that the mate source node is attempting to establish a network connection (C/R bit is 0 and MEP Action has a value of 3), the state of the FSM is Attempting, and the FSM is running on the alternate source node, (3) the FSM is in a state of Attempting and the node on which the FSM resides fails to establish the connection, (4) the local UNI port has come up from being down, the value of the Last Received Mate Indication in the data structure is "Mate Attempting Network Connection", and the FSM is running on the primary source node, or (5) the node on which the FSM resides receives release in response to a network connection establishment attempt, the value of the Reattempt Countdown is equal to zero, and the ICC is up.

Network Connection Reattempt: This event is used to indicate that the FSM should attempt to establish a connection. The event is triggered in one of three ways: (1) the node on which the FSM resides receives a release in response to a network connection establishment attempt and the value of the Reattempt Countdown is greater than zero, (2) the node on which the FSM resides receives a release with respect to the network connection when the FSM is in an Up state, or (3) the node on which the FSM resides receives a release in response to a network connection establishment attempt, the value of the Reattempt Count is 0, and the ICC is down.

Network Connection Connect Received: This event is used to indicate that the node on which the FSM resides has established a network connection. The event is triggered when the node is attempting to establish the network connection and a connect is received for the connection.

Local UNI Port Failure: This event is used to indicate that the local UNI port has failed and can no longer be used for the network connection, and that the node's mate must attempt to establish the network connection. The event is triggered upon receipt of a notification that the local UNI port has failed.

For each FSM, when an event occurs a transition to a new state may occur, and the FSM may take an action. Each cell within then table shown in FIG. 3 indicates an action to be taken (upper line of cell) and the new state to which the FSM transits (lower line of cell). A cell may also indicate FSM_ERR, which represents an internal implementation error. If a cell includes FSM_ERR, then the corresponding event should not have been triggered while the FSM is in the corresponding state, and an error has occurred.

The actions which may be taken by the FSM and indicated in the cells of the table are defined as follows:

Action 0: No action is taken.

Action 1: If there is more than one possible destination endpoint configured in the Possible Destinations in the data structure, then set the value of Reattempt Countdown equal to the value of Maximum Reattempt, otherwise set the value of Reattempt Countdown equal to 0. Set the Current Destination to the first, or only, destination in the Possible Destinations. Send a Mate Attempting Network Connection MEP command message (C/R bit set to 0, MEP Action set to 3) to the mate FSM. Attempt to establish a network connection to the Current Destination.

Action 2: If there is more than one possible destination endpoint configured in the Possible Destinations in the data structure, then set the value of Reattempt Countdown equal to the value of Maximum Reattempt, otherwise set the value of Reattempt Countdown equal to 0. Send a Mate Attempting Network Connection MEP command message (C/R bit set to 0, MEP Action set to 3) to the mate FSM. Attempt to establish a network connection to the Current Destination. Note that this action differs from Action 1. In Action 2, the network connection was up and was released. In such an event, the node should first attempt to re-establish the network connection to the same destination node in order to have as little impact on customer traffic as possible.

Action 3: Release any outstanding network connections attempts. Send a Mate Network Connection Down MEP command message (C/R bit set to 0, MEP Action set to 1) to the mate FSM.

Action 4: Release the current network connection.

Action 5: Decrement the Reattempt Countdown. Update Current Destination to the next endpoint in Possible Destinations. Attempt to establish a network Connection to the new Current Destination.

Action 6: Send a Mate Network Connection Up MEP command message (C/R bit set to 0, MEP Action set to 2) to the mate FSM, if the ICC is up. If the ICC is not up, do nothing.

Action 7: Release any outstanding network connection attempts, and send a Mate Network Connection Down MEP command message (C/R bit set to 0, MEP Action set to 1) to the mate FSM.

Action 8: Release the current network connection, and send a Mate Network Connection Down MEP command message (C/R bit set to 0, MEP Action set to 1) to the mate FSM.

Any physical occurrence not listed among the triggers of the events above does not produce one of the events. For example, if the FSM on the primary source node is in the Up state and receives a Mate Network Connection Up MEP command message, the message is ignored.

As can be seen from the events and states described above, redundancy of the MEP SPVC (the network connection) is provided by the ICC and the FSMs. This can be illustrated by way of an example failure and response, in which the primary network connection 30 is initially up, both local UNIs are up, the ICC is up, and the primary source node will be unable to establish a network connection to either destination node. When the primary network connection 30 fails, the following sequence of actions and state transitions occurs:

a) FSM 50 receives a Network Connection Reattempt event (condition 2)
 b) FSM 50 enters Attempting state
 c) FSM 50 sends a Mate Attempting Network Connection MEP command message to FSM 52, and attempts to re-establish the network connection to the current destination node (Action 2)
 d) FSM 52 receives the MEP command message, which triggers a Mate Attempting Network Connection event (condition 1)
 e) FSM 52 enters Mate Attempting state, takes no other action
 f) FSM 50 (meanwhile) fails to re-establish a network connection to the current destination, receives a Network Connection Reattempt event (condition 1)
 g) FSM 50 attempts to establish a network connection to the next destination node (Action 5)
 h) FSM 50 repeats step G, until there are no more destinations, whereupon FSM 50 receives a Mate Attempting Network Connection event (condition 5)
 i) FSM 50 enters Mate Attempting state, stops attempting to establish a network connection, and sends a Mate Network Connection Down MEP command message (MEP Action value of 1) to FSM 52 (Action 3)
 j) FSM 52 receives the MEP command message, which triggers a Mate Network Connection Down event (condition 2)
 k) FSM 52 enters the Attempting state, and begins attempting to establish a network connection (Action 2)
 l) FSM 52 successfully establishes a network connection, which triggers a Network Connection Connect Received event
 m) FSM 52 enters the Up state, and sends a Mate Connection Up MEP command message to FSM 50 (Action 6)
 n) FSM 50 receives the MEP command message which triggers a Mate Network Connection Up event, and enters the Mate Up state In a second example, the primary source node fails, causing the primary network connection to fail. The alternate source node is initially in a state of Mate Up. The following sequence of actions and state transitions occurs:

a) Until failure of the primary source node, the FSM 50 sends MEP_Poll messages at regular intervals over the ICC to the FSM 52.
 b) When the primary source node fails, the FSM 50 stops sending MEP_Poll messages.
 c) The Intermate Connection Inactivity Timer on the FSM 52 expires due to no MEP command messages, including MEP_Poll messages, being received. This triggers a Mate Network Connection Down event on FSM 52 (condition 1).
 d) FSM 52 enters a state of Attempting, and attempts to establish a network connection to the current destination node (Action 2).
 e) FSM 52 establishes a connection to the current destination node.
 f) FSM 52 receives a Network Connection Connect Received event, upon receiving a connect signal for the connection.
 g) FSM 52 enters a state of Up. If the ICC has been re-established by this point, FSM 52 sends a Mate Network Connection Up MEP command message to FSM 50 (Action 6).

In the preferred embodiment, the methods of the FSM are carried out by software instructions within a processor within each router, but may more generally be carried out by any combination of software or hardware, including hardware within an integrated circuit. The processor need not be a single device, but rather the instructions or could be located in more than one device.

The embodiments presented are exemplary only and persons skilled in the art would appreciate that variations to the embodiments described above may be made without departing from the spirit of the invention. Methods that are logically equivalent or similar to the finite state machine of FIG. 3 may be used to implement the methods of the invention. The scope of the invention is solely defined by the appended claims.

We claim:

1. A method for providing redundancy for communications through a communication network, comprising:
 establishing an Intermate Communication Channel (ICC) between a first source node and a second source node;
 establishing a primary Soft Permanent Virtual Circuit (SPVC) network connection through the first source node to one of a list of possible destination nodes;
 determining whether the second source node is to attempt establishment of an alternate network connection;
 when the second source node is to attempt establishment of the alternate network connection, establishing the alternate network connection through the second source node to one of the list of possible destination nodes; and
 using finite state machines (FSMs) residing on the first source node and the second source node to establish connections to at least one destination node, wherein each FSM operates in the following states:
 down, as an initial state and when a connection between the source node on which the FSM resides and the destination node is down,
 up, when a connection is established from the source node on which the FSM resides to the destination node,
 attempting, when the source node on which the FSM resides is attempting to make a connection,
 mate attempting, when a source node on which the FSM does not reside is attempting to make a connection, and
 mate up, when a connection is established through the source node on which the FSM does not reside.

2. The method of claim 1, where determining whether the second source node is to attempt establishment of an alternate network connection comprises:
 determining whether the first source node cannot support the SPVC network connection;
 when the first source node cannot support the SPVC network connection, determining that the second source node is to attempt establishment of the alternate network connection;
 at the second source node, determining whether the ICC has failed; and when the ICC has failed, determining that the second source node is to attempt establishment of the alternate network connection.

3. The method of claim 2 wherein determining whether the first source node cannot support the SPVC network connection comprises:
determining whether the primary SPVC network connection has failed;
when the primary SPVC network connection has failed, determining whether the first source node can re-establish the SPVC network connection; and
when the first source node cannot re-establish the SPVC network connection, determining that the first source node cannot support the SPVC network connection.

4. The method of claim 3 wherein determining whether the first source node can re-establish the SPVC network connection comprises:
attempting to establish the SPVC network connection to each possible destination node in turn until either a connection is established to at least one possible destination node or establishment of a connection to every possible destination node has been unsuccessfully attempted; and
determining that the first source node cannot re-establish the SPVC network connection if establishment of a connection to every possible destination node has been unsuccessfully attempted.

5. The method of claim 4 wherein determining whether the ICC has failed comprises:
operating an Intermate Connection Inactivity Timer on the second source node;
restarting the Intermate Connection Inactivity Timer when a command message is received at the second source node from the first source node; and
when the Intermate Connection Inactivity Timer expires, determining that the ICC has failed.

6. The method of claim 5 wherein establishing an ICC comprises
establishing a connection-oriented bearer independent connection.

7. The method of claim 6,
wherein each command message is a Generic Application Transport (GAT) information element which includes a Multi-endpoint (MEP) Action field indicating a type of the command message, and
wherein the type of the command message is one of:
a poll message,
a message indicating that the source node originating the command message is not supporting the SPVC network connection,
a message indicating that the source node originating the command message is supporting the SPVC network connection, and
a message indicating that the source node originating the command message is attempting to establish the SPVC network connection.

8. A node within a communication network, comprising:
a finite state machine (FSM) residing on a first source node and a second source node to establish connections to at least one destination node for storing a state of the node, wherein each FSM operates in the following five states:
down, as an initial state and when a connection between the source node on which the FSM resides and the destination node is down,
up, when a connection is established from the source node on which the FSM resides to the destination node,
attempting, when the source node on which the FSM resides is attempting to make a connection,
mate attempting, when a source node on which the FSM does not reside is attempting to make a connection, and
mate up, when a connection is established through a source node on which the FSM does not reside;
a memory for storing a data structure, the data structure including an indication of whether the source node is a first source node or a second source node and an indication of whether the FSM is a master FSM or a slave FSM;
means for establishing an Intermate Communication Channel (ICC) to a mate node in the event that the FSM is the master FSM;
means for determining whether the ICC is up;
means for establishing an SPVC network connection in the event that the node is a first source node;
means for establishing the SPVC network connection in the event that the node is an second source node and that the FSM indicates a down state; and
means for establishing the SPVC network connection in the event that the source node is the second source node and that the ICC is not up.

9. The node of claim 8,
wherein the data structure comprises an Intermate Connection Inactivity Timer, and
wherein the means for determining whether the ICC is up comprises:
means for restarting the Intermate Connection Inactivity Timer upon receipt of a command message over the ICC; and
means for determining that the ICC is not up upon expiry of the Intermate Connection Inactivity Timer.

10. The node of claim 9 further comprising:
means to set the FSM to the down state upon receipt of a command message indicating that the source node on which the FSM does not reside is not supporting the SPVC network connection.

* * * * *

UNITED STATES PATENT AND TRADEMARK OFFICE
CERTIFICATE OF CORRECTION

| | | |
|---|---|---|
| PATENT NO. | : 7,590,053 B2 | Page 1 of 1 |
| APPLICATION NO. | : 11/156566 | |
| DATED | : September 15, 2009 | |
| INVENTOR(S) | : Roberts et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 977 days.

Signed and Sealed this

Twenty-sixth Day of October, 2010

David J. Kappos
*Director of the United States Patent and Trademark Office*